United States Patent [19]

Yeadon et al.

[11] Patent Number: 4,490,608
[45] Date of Patent: Dec. 25, 1984

[54] POSITION SENSOR

[75] Inventors: Edward C. Yeadon; Richard W. Laciny, both of London, England

[73] Assignee: Crosfield Electronics Limited, London, England

[21] Appl. No.: 311,474

[22] Filed: Oct. 14, 1981

[30] Foreign Application Priority Data

Oct. 21, 1980 [GB] United Kingdom ............... 8033885

[51] Int. Cl.³ .......................................... H01J 40/14
[52] U.S. Cl. ................................ 250/235; 250/237 G; 358/293
[58] Field of Search ................. 250/201, 234, 237 R, 250/237 G, 235, 236; 346/76 L, 108, 109; 358/206, 208, 293; 350/6.6–6.8

[56] References Cited

U.S. PATENT DOCUMENTS

| 3,835,249 | 9/1974 | Dattilo et al. | 350/6.8 X |
| 4,040,745 | 8/1977 | Belleson et al. | 350/431 X |
| 4,293,202 | 10/1981 | Ohnishi et al. | 346/108 X |
| 4,352,984 | 10/1982 | Ohara | 250/234 |
| 4,386,272 | 5/1983 | Check, Jr. et al. | 346/108 X |

Primary Examiner—F. L. Evans
Attorney, Agent, or Firm—Sughrue, Mion, Zinn, Macpeak, and Seas

[57] ABSTRACT

A flying spot scanner is used to expose a photosensitive surface to an intensity modulated beam of light to build up an image on the photosensitive surface. Such a scanner includes a position sensor comprising an elongate grating (14), means to take part of the beam of light from the scanning head (8) of the flying spot scanner and apply it to the grating (14) so that it scans in a direction along the grating, the rulings of the grating forming an oblique angle with the direction of scanning of the part of the beam of light, a photodetector (17) arranged to monitor the interaction of the part of the beam of light with the grating, means (13, 16) to produce a signal representative of the position of the beam of light in its direction of scanning, and means (20) to mix the output signal from the photodetector (17) with the signal representative of the position of the part of the beam of light to provide a phase modulated output signal, the phase modulation of which gives an indication of the position of the scanning beam of light in a direction transverse to its scanning direction. Preferably the means to produce a signal representative of the position of the beam in its direction of scanning includes a second grating (13) and photodetector (16).

12 Claims, 4 Drawing Figures

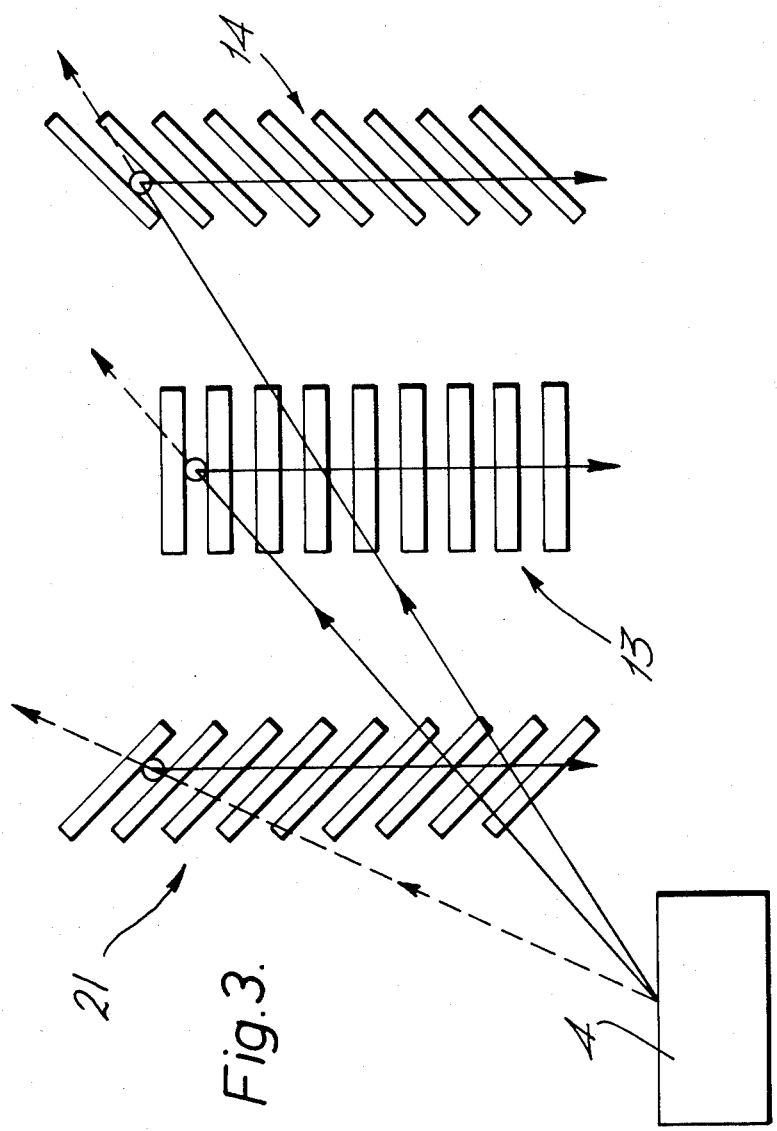

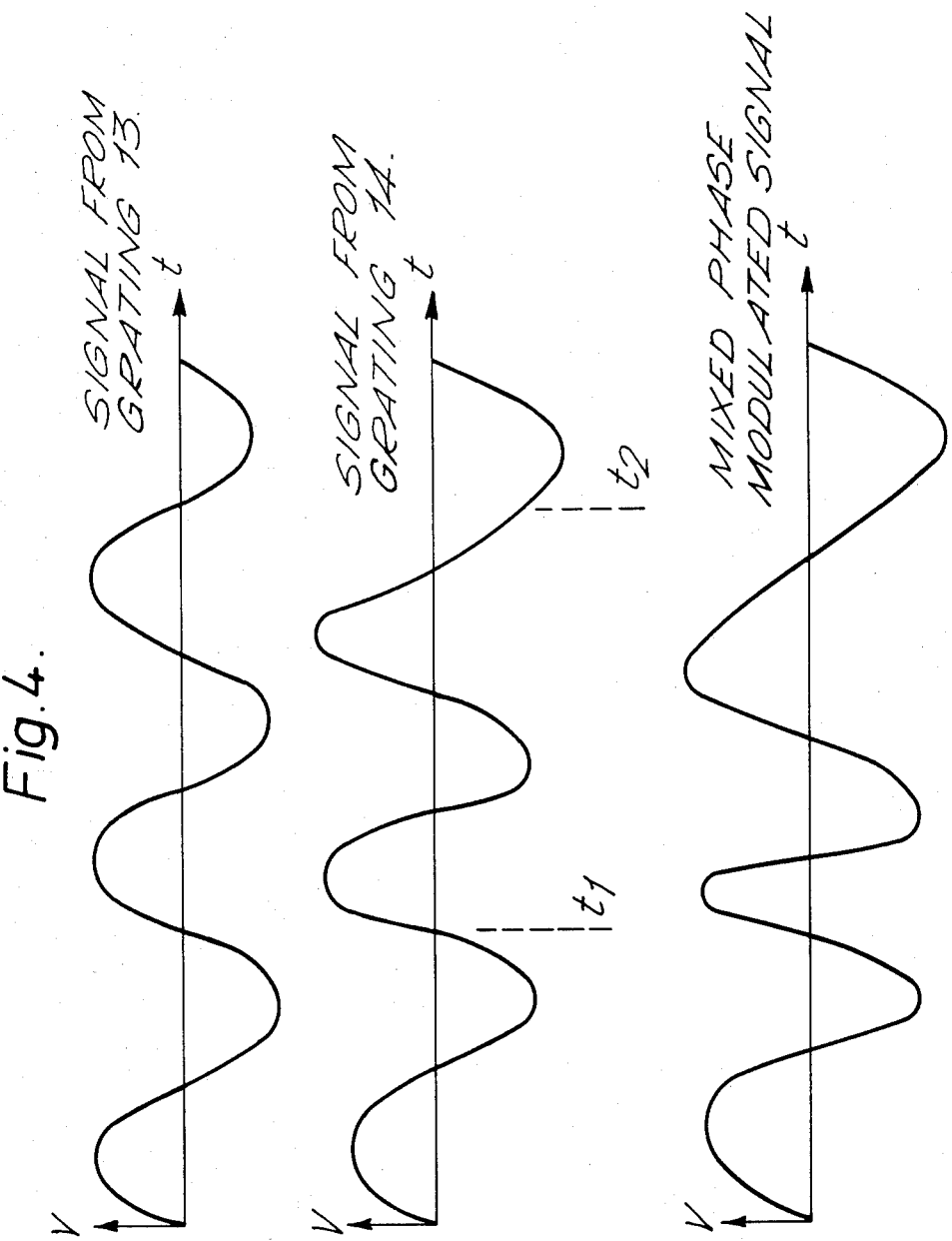

POSITION SENSOR

A flying spot scanner is used to expose a photosensitive surface to an intensity modulated beam of light to build up an image on the photosensitive surface. The scanning head of such a scanner may be formed by a rotating prism or mirror drum, or an oscillating mirror. A beam of light is reflected from the scanning head and scanned over the photosensitive surface by rotation or oscillation of the scanning head. Such flying spot scanners have to be constructed to a high degree of accuracy, particularly with regard to their scanning heads since the light beam acts as an optical lever and so amplifies any inaccuracies present in the scanning head.

To reduce the errors present in the scan on the photosensitive surface and to reduce the expense and complexity of the flying spot scanner it has recently been proposed to include a sensor to detect the instantaneous position of the light beam and a deflector to shift the light beam into its required position in combination with a flying spot scanner. Such a system enables the flying spot scanner to operate with less accurately manufactured scanning heads whilst, at the same time, providing a high degree of accuracy in the final scan on the photosensitive surface. The position sensor and the deflector operate in real time and are able to accommodate periodic errors, for example errors in the machining of the mirror drum and also non-periodic errors such as those caused by the distortion of the frame of the flying spot scanner or by vibration or jitter induced in the scanning head which may be transmitted from its drive and may include an oscillation at mains frequency.

To enable such a system to operate effectively, it is necessary to have a position sensor which monitors the instantaneous position of the light beam to a high degree of accuracy. It is difficult to obtain such accuracy because an error in the position of the light beam on the photosensitive surface of the order of 0.1 μm in a direction transverse to the scanning direction is sufficient to be noticeable, particularly if it is repetitive and it is difficult to get such a high degree of accuracy using conventional position sensors.

According to this invention a flying spot scanner includes a position sensor comprising an elongate grating, means to take part of the beam of light from the scanning head of the flying spot scanner and apply it to the grating so that it scans in a direction along the grating, the rulings of the grating forming an oblique angle with respect to the direction of scanning of the part of the beam of light, a photodetector arranged to monitor the interaction of the part of the beam of light with the grating, means to produce a signal representative of the position of the part of the beam of light in its direction of scanning, and means to mix the output signal from the photodetector with the signal representative of the position of the part of the beam of light to provide a phase modulated output signal, the phase modulation of which gives an indication of the position of the scanning beam of light in a direction transverse to its scanning direction.

Because the information with regard to the transverse position of the beam is presented as the phase modulation of a phase modulated signal it is not directly affected by changes in the intensity of the light beam resulting, for example, from its modulation. Further, such a signal can be readily processed to enable it to be used to control a deflector included in the flying spot scanner to correct for any error in the position of the light beam. Some flying spot scanners include a considerable amount of inertia, particularly in the scanning direction and, consequently, there is substantially no error in the position of the scanning beam of light in its scanning direction and, errors only occur in a direction transverse to the scanning direction. Under these circumstances, the means to produce a signal representative of the position of the part of the beam of light in its direction of scanning may be formed by a simple oscillator the frequency of which is matched to the movement of the beam of light in its scanning direction, since such a signal is representative of the position of the beam of light in its scanning direction when this is completely predictable.

However, it is very much preferred that the means to produce a signal representative of the position of the part of the beam of light in its direction of scanning includes another elongate grating, means to take part of the beam of light from the scanning head of the flying spot scanner and apply it to the other grating so that it scans in a direction along the other grating, and another photodetector arranged to monitor the interaction of the part of the beam of light with the other grating. With the position sensor arranged in this way, the frequency of the phase modulated signal produced by combining the output of the two photodetectors provides an indication of the position of the beam of light in its scanning direction whilst the phase of the phase modulated signal provided by combining the output of the two photodetectors again gives information with regard to the position of the beam of light in the direction transverse to the scanning direction. Thus, under these circumstances, the position sensor is able to produce information with regard to the exact position of the beam of light in two mutually perpendicular directions and so provide exact information with regard to the instantaneous location of the beam of light with respect to the photosensitive surface.

The other grating may also have rulings which form an oblique angle with the direction of scanning of the part of the beam of light and, in this case, the grating must be ruled in the opposite sense. With the other grating arranged in this way, any error in the transverse position of the beam of light results in a greater phase modulation of the signal since the output of both photodetectors is responsive to any inaccuracies in the position of the beam of light in the transverse direction. Alternatively, the rulings of the other grating may be arranged substantially perpendicularly to the direction of scanning of the part of the beam of light. In this case, the output from the other photodetector provides information with regard to the instantaneous position of the light beam in the direction of scanning.

Whilst the phase modulation which is created is insensitive to variation in the intensity of the scanning beam the variations in intensity are inconvenient because the fluctuating power level reduces the sensitivity of the position sensor. Further, the beam may be completely turned off for a relatively long period and during such a period, no positional information with regard to the position of the beam can be obtained. Further, the wavelength and average beam power of the scanning beam are determined with respect to the characteristics of the photosensitive surface and therefore they may not be very well matched to, for example, the photodetector associated with the position sensor.

Thus it is preferred that the flying spot scanner includes two light sources, an optical multiplexer located in the optical path between the modulator and the scanning head to combine light from the two sources into a single composite beam, and an optical demultiplexer in the optical path between the scanning head and the photosensitive surface to resolve the single composite beam into light from the two sources, to apply light from one light source to the photosensitive surface and to apply light from the other light source to a beam position sensor.

By providing a second light source and mixing this with the light from the first light source downstream from the modulator, the light from the second light source which is subsequently applied to the position sensor can be arranged to have a substantially constant intensity and an intensity and characteristic which is matched solely to the characteristics of the photodetector. Thus, even if the modulated light beam from the one light source is switched off, the position sensor is still capable of emitting positional information.

The light from the two sources must have different characteristics to enable it to be resolved and light from the two sources may have different polarisation states. However, it is much preferred that the two sources emit light of different colours. With this arrangement the colour of the light emitted by each source can be specially selected for its own particular function. Thus, the light from the one light source can be specially selected to be of a colour to which the photosensitive surface is most sensitive whereas the light from the other source can be of a colour which is matched to the characteristics of a detector associated with a position sensor. When the two sources are of different colour, it is preferred that the optical multiplexer and demultiplexer are formed by dichroic mirrors arranged to transmit light from the one source and reflect light from the other source. Where the photosensitive surface is a photographic film it is preferred that the one source is an argon ion laser which emits blue light and it is also preferred that the other source is a helium neon laser which emits red light. A further advantage of these two different colours is that if any red light from the helium neon laser does "leak" onto the photographic film the photographic film is substantially insensitive to red light and therefore it does not affect the exposure of the photosensitive film.

The position sensor usually forms part of a position feedback system to correct the position of a beam of light in a flying spot scanner and, under these circumstances, the phase modulated signal is preferably processed by pulse shaping it using a threshold detector and automatic gain feedback loop to provide a series of square pulses and then processing these with a phase comparator. This provides a simple DC output the level of which varies with the phase difference between the outputs of the two photodetectors. Thus, if this DC signal is applied as a control signal to the deflector unit, the entire control loop is arranged to reduce any phase difference between the outputs of the two photodetectors to zero.

The gratings may be reflection gratings and, in this case, the photodiodes are arranged on the same sides of the gratings as the beam of light but, preferably, the gratings are transmission gratings and, in this case, the photodiode is arranged on the opposite side of the grating to the beam of light. When the gratings are transmission gratings, it is also preferred that a diffuser and a collecting lens system is arranged between each grating and its associated photodetector.

Preferably the rulings of the, or each, grating having rulings arranged at an oblique angle to the scanning direction, are arranged at substantially 45° to the scanning direction. When two gratings are used, the pitch of the rulings in the scanning direction is preferably the same although, if it is not possible to arrange this, a scaling factor may be introduced by multiplying or dividing the frequency of the output of one of the photodetectors before missing it with the output of the other photodetector.

A particular example of a flying spot scanner including a position sensor in accordance with this invention will now be described with reference to the accompanying drawings; in which:

FIG. 3 is a plan of various different gratings; and,

FIG. 4 is a graph showing the outputs of the two photodetectors.

Figure 1:
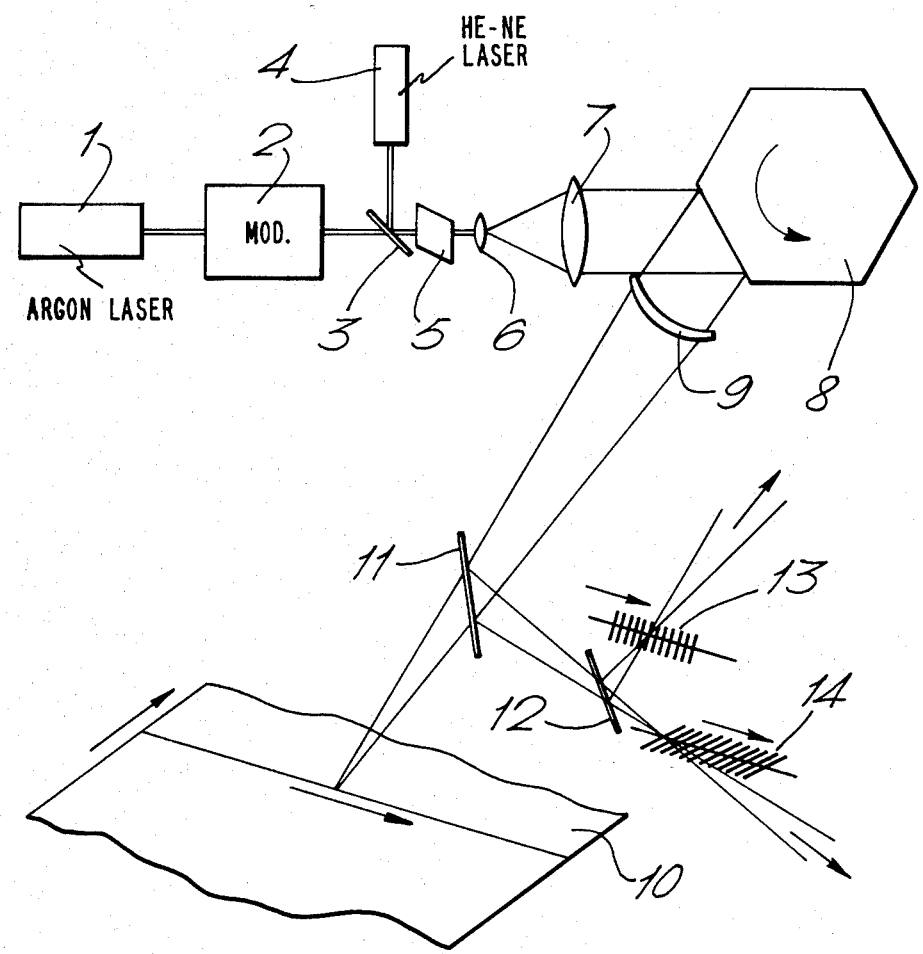
FIG. 1 is a diagram of the optical system.

An argon ion laser 1 emits a constant intensity blue beam of light into a modulator 2. The blue beam of light is intensity modulated in the modulator 2 by, for example, video data. The output from the modulator 2 passes through a dichoric mirror 3. A helium neon laser 4 emits a constant intensity beam of red light and this impinges on the dichroic mirror 3 and is reflected from it to form a single composite beam of both red and blue light. This single composite beam then passes through a compensating deflector 5. Preferably the compensating deflector 5 is achromatic so that it deflects both the red and blue components of the composite beam to the same extent. Typically, the compensating deflector 5 may be formed by a plane mirror mounted on a piezo electric block so that the angle of the mirror changes depending upon the signal applied to the piezo electric block, a galvanometer mirror or an electro-optic device such as a prism, the angle of deviation of which varies with the electrical field applied across the prism.

From the compensating deflector 5 the composite beam passes through a beam expander formed by a pair of lenses 6 and 7 and then to the scanning head of the flying spot scanner which, in this example, is a hexagonal mirror drum 8. The output from the mirror drum 8 passes through a flat field lens 9 which focuses the beam onto the surface of a photosensitive medium 10 which, in this example, is a film of photographic material. A second dichroic mirror 11 is interposed between the flat field lens 9 and the photosensitive film 10 and again, the blue component of the composite light beam passes straight through the dichroic mirror 11 whilst the red component of the composite beam is reflected by the dichroic mirror 11. The red component then passes to a beam splitter 12 which divides the red component into two separate beams of substantially equal intensity and then the beams impinge upon transmission gratings 13 and 14. Upon rotation of the mirror drum 8 the light beam is scanned across the film 10. The film 10 is moved forward so that, upon the next pass of the beam across the film the beam follows a parallel path. The scanning movement of the beam caused by the mirror drum 9 also causes the red component of the beam to scan along the gratings 13 and 14.

The rulings of the grating 13 are arranged perpendicularly to the direction of scanning of the beam of light whereas the rulings on the grating 14 are arranged at an oblique angle to the direction of scanning and this oblique angle is preferably 45°. The pitch of both gratings in the direction of their scanning is the same. A diffusing screen together with a collecting lens 15 and photodetectors 16 and 17 are provided behind the gratings 13 and 14, respectively. Thus, as the red light beam passes over the ruled and unruled portions of the transmission gratings 13 and 14, the light transmitted by the grating and that which is collected by the lens 15 onto the photodetectors 16 and 17 varies to provide an amplitude modulated signal of the output of each of the photodetectors 16 and 17.

When the composite beam is moved strictly in the scanning direction by this mirror drum 8 the spots of light traversing the gratings 13 and 14 each pass over the rulings of their respective gratings in phase so that the outputs of the photodetectors 16 and 17 are oscillating signals which are strictly in phase. Any irregularity in the speed of scanning over the surface of the photosensitive film 10 caused by, for example, an irregularity in the rotation of the mirror drum can be detected by monitoring the frequency of the output of the signals from the photodetectors 16 and 17, and so the drive of the mirror drum 8 controlled or, alternatively, a further deflector introduced into the light path to cause a deflection of the composite beam in the direction of scanning. If there is any movement of the composite beam in a direction transverse to the scanning direction caused, for example, by a difference in the angle of the adjacent faces of the mirror drum 8, or by any other irregularity in the flying spot scanner, the spots of light on the gratings 13 and 14 move sideways as seen in FIG. 3. Clearly, sideways movement on the grating 13 does not have any effect whatsoever on the output signal from the photodetector 16. However, a transverse movement of the spot of light on the grating 14 with the oblique ruling causes the phase of the output signal received by the photodetector 17 to change since, if the spot moves to the right as seen in FIG. 3, the spot of light is obscured by the ruling at an earlier time than if the spot of light is in the centre of the grating and, vice versa. Thus, when the composite beam moves in a direction transverse to the scanning direction, a change in phase occurs between the outputs of the photodetectors 16 and 17. By monitoring this change in phase, transverse error signals can be obtained which, upon application to the compensating deflector 5 can be used to return the beam to its correct position in a direction transverse to the scanning direction.

Figure 2:
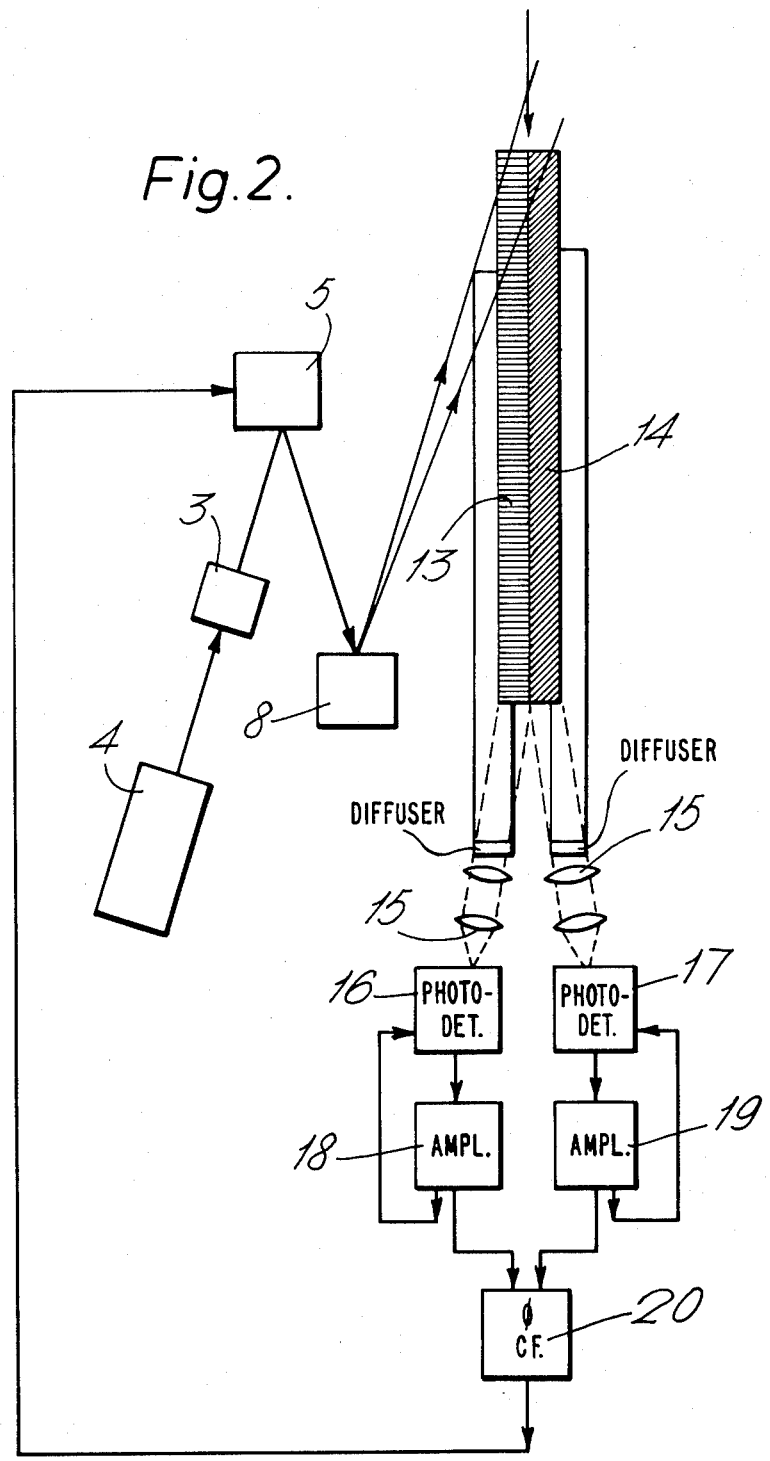
FIG. 2 is a block diagram of the electronic control system.

The electronic circuit for processing the signal from the photodetectors 16 and 17 is shown in FIG. 2. The output signal from the photodetectors 16 and 17 is fed to amplifiers 18 and 19 respectively. Both amplifiers include an automatic gain control feedback loop so that the output from the amplifiers 18 and 19 is constant and equal. The output from the amplifiers 18 and 19 is then compared in a phase comparator 20. The phase comparator 20 comprises a pulse shaping circuit to square the outputs from the amplifiers 18 and 19 and a processing circuit to produce a voltage proportional to the phase difference between these two series of square pulses. When the series of pulses derived from the photodetectors 16 and 17 are in phase there is no output from the processing circuit but, if there is a difference in phase between the two series of pulses a DC output is obtained from this circuit, the polarity and magnitude of which will depend upon the phase relationship between the outputs of the detectors 16 and 17. Thus, by applying the output of the phase comparator 20 to the compensating deflector 5 a feedback loop is provided between the position of the composite beam in a direction transverse to its scanning direction with the result that any deviation in the position of the composite beam in the direction transverse to the scanning direction is automatically returned to null by the combination of the position sensor and the compensating deflector 5.

If the compensating deflector 5 is not achromatic, so that the red beam is deflected by a different amount from the blue beam it is, of course, possible to calibrate the position sensor so that the correct deviation is applied to the blue component of the composite beam. The grating 21 shown in FIG. 3 may be used instead of the gratings 13 and this modification provides a system which is twice as sensitive to the position of the beam in the direction transverse to its scanning direction since any change in the position of the light beam in the direction transverse to its scanning direction causes the output signals of both the photodetectors 16 and 17 to change in phase but in opposite directions.

It is particularly preferred that the beams are of different colour because the photosensitive film 10 is particularly sensitive to blue light and substantially insensitive to red light whereas the photodetectors 16 and 17 are much more sensitive to red light than blue light. In particular, the photodetectors 16 and 17 may be formed by avalanche photodiodes which are particularly suitable under conditions of low light level and particularly suitable for detecting red light.

We claim:

1. In a flying spot scanner including one light source for producing a beam of light, a photosensitive surface, means for scanning said light beam across said photosensitive surface, and means to produce a signal representative of the position of said beam of light in its direction of scanning; the improvement whereby a transverse beam position sensor is included, said transverse beam position sensor comprising:
   one ruled elongate grating;
   means to take part of said beam of light from said means for scanning and apply it to said ruled elongate grating whereby it scans in a direction along said ruled elongate grating;
   rulings of said ruled elongate grating forming an oblique angle with said scanning direction of said part of said beam of light along said ruled elongate grating;
   a photodetector arranged to monitor interaction of said part of said beam of light with said ruled elongate grating and output a signal dependent upon said interaction; and,
   means to mix said output signal from said photodetector with said signal representative of said position of said beam of light to provide a phase modulated signal, the phase modulation of said signal providing an indication of the position of said scanning beam of light in a direction transverse to its scanning direction.

2. The flying spot scanner of claim 1, wherein said means to produce a signal representative of the position of said beam of light in its direction of scanning includes:
   another ruled elongate grating;
   means to take part of said beam of light from said means for scanning and apply it to said other ruled elongate grating; and, another photodetector arranged to monitor the interaction of said part of said beam of light with said other grating.

3. The flying spot scanner of claim 2, wherein rulings of said other elongate grating form an oblique angle with said scanning direction of said part of said beam of light along said other ruled elongate grating; and wherein said rulings of said other grating are inclined in the opposite sense to those of said one grating.

4. The flying spot scanner of claim 2, wherein rulings of said other grating are arranged substantially perpendicularly to said scanning direction of said part of said beam of light.

5. The flying spot scanner of claim 1, which includes another light source, an optical multiplexer located in an optical path upstream of said means for scanning to combine light from said two sources into a single composite beam, and an optical demultiplexer in an optical path between said means for scanning and said photosensitive surface to resolve said single composite beam into light from said two sources, to apply light from said one light source to said photosensitive surface and to apply light from said other light source to a beam position sensor.

6. The flying spot scanner of claim 5, wherein said light sources emit light of different colour.

7. The flying spot scanner of claim 5, wherein said one light source is an argon ion laser and said other light source is a helium neon laser.

8. The flying spot scanner of claim 5, wherein said optical multiplexer and demultiplexer are formed by dichroic mirrors arranged to transmit light from said one light source and reflect light from said other light source.

9. The flying spot scanner of claim 1, wherein said ruled elongate grating is a transmission grating, wherein said photodetector is arranged on the opposite side of said ruled elongate grating to said beam of light, and wherein a diffuser and a collecting lens system is arranged between said ruled elongate grating and said photodetector.

10. The flying spot scanner of claim 1, wherein said rulings of said ruled elongate grating having rulings arranged at an oblique angle to the scanning direction, are arranged at substantially 45° to said scanning direction.

11. In a flying spot scanner including a light source for producing a beam of light, a photosensitive surface, and means for scanning said light beam across said photosensitive surface; the improvement wherein said scanner also includes a scanning direction beam position sensor comprising:
   a first ruled elongate grating;
   means to take part of said beam of light from said means for scanning and apply it to said first ruled elongate grating; and
   a first photodetector arranged to monitor the interaction of said part of said beam of light with said first ruled elongate grating: and said scanner also includes a transverse beam position sensor comprising:
   a second ruled elongate grating;
   means to take part of said beam of light from said means for scanning and apply it to said second ruled elongate grating whereby it scans in a direction along said second ruled elongate grating;
   rulings of said second ruled elongate grating forming an oblique angle with said scanning direction of said part of said beam of light along said second ruled elongate grating;
   a second photodetector arranged to monitor interaction of said part of said beam of light with said second ruled elongate grating and output a signal dependent upon said interaction; and,
   means to mix said output signal from said second photodetector with that from said first photodetector to provide a phase modulated signal, the phase modulation of said phase modulated signal providing an indication of the position of said scanning beam of light in a direction transverse to its scanning direction.

12. The flying spot scanner of claim 11, which includes another light source, an optical multiplexer located in an optical path upstream of said means for scanning to combine light from said two sources into a single composite beam; and, an optical demultiplexer in an optical path between said means for scanning and said photosensitive surface to resolve said single composite beam into light from said two sources, to apply light from said one light source to said photosensitive surface and to apply light from said other light source to said beam position sensors.

* * * * *